(12) United States Patent
McKie et al.

(10) Patent No.: US 10,254,003 B2
(45) Date of Patent: Apr. 9, 2019

(54) LAYOUT FOR AN ENERGY RECOVERY VENTILATOR SYSTEM

(71) Applicant: Lennox Industries Inc., Richardson, TX (US)

(72) Inventors: Justin McKie, Frisco, TX (US); Eric Perez, Hickory Creek, TX (US); Bryan Smith, McKinney, TX (US); Steve Schneider, Plano, TX (US)

(73) Assignee: Lennox Industries Inc., Richardson, TX (US)

( * ) Notice: Subject to any disclaimer, the term of this patent is extended or adjusted under 35 U.S.C. 154(b) by 270 days.

(21) Appl. No.: 15/187,073

(22) Filed: Jun. 20, 2016

(65) Prior Publication Data

US 2016/0298869 A1    Oct. 13, 2016

Related U.S. Application Data

(62) Division of application No. 13/274,629, filed on Oct. 17, 2011, now Pat. No. 9,395,097.

(51) Int. Cl.
*F24F 12/00* (2006.01)
*B23P 15/26* (2006.01)
(Continued)

(52) U.S. Cl.
CPC ............ *F24F 12/001* (2013.01); *B23P 15/26* (2013.01); *F24F 13/20* (2013.01); *F24F 13/30* (2013.01);
(Continued)

(58) Field of Classification Search
CPC ........ B21D 53/02; B23P 15/26; F24F 12/001; F24F 12/006; F24F 13/20; F24F 13/30;
(Continued)

(56) References Cited

U.S. PATENT DOCUMENTS 4,611,653 A * 9/1986 Ikemura ................ F24F 12/001
165/54
5,183,098 A * 2/1993 Chagnot ............... F24F 3/1423
165/54
(Continued)

OTHER PUBLICATIONS

JPH0634175A, Nakamura Yotsuo et al., Aug. 1994, Japanese and English Machine Translation.*

*Primary Examiner* — Sarang Afzali
(74) *Attorney, Agent, or Firm* — Baker Botts L.L.P.

(57) ABSTRACT

A method of manufacturing an energy recovery ventilator unit includes providing a cabinet having exterior walls and interior floors and walls that define an intake zone, a supply zone, a return zone, an exhaust zone and an enthalpy-exchange zone. The intake zone and the exhaust zone are both on one side of the enthalpy exchange zone. The supply zone and the return zone are both on an opposite side of the enthalpy exchange zone. The method further includes installing a first blower in the intake zone. The first blower pushes outside air into the intake zone and straight through the enthalpy exchange zone into the supply zone. The method also includes installing a second blower in the return zone. The second blower pushes return air into the return zone and straight through the enthalpy exchange zone into the exhaust zone.

6 Claims, 4 Drawing Sheets

(51) Int. Cl.
*F24F 13/20* (2006.01)
*F24F 13/30* (2006.01)

(52) U.S. Cl.
CPC ... *F24F 2013/205* (2013.01); *F24F 2203/104* (2013.01); *Y02B 30/563* (2013.01); *Y10T 29/4935* (2015.01)

(58) Field of Classification Search
CPC .......... F24F 2012/007; F24F 2012/008; F24F 2011/0002; F24F 2011/0056; F24F 2013/205; F24F 2203/104; Y10T 29/4935; Y02B 30/563
See application file for complete search history.

(56) References Cited

U.S. PATENT DOCUMENTS

| | | | | |
|---|---|---|---|---|
| 5,826,641 | A * | 10/1998 | Bierwirth | F24F 3/1411 165/48.1 |
| 5,988,157 | A * | 11/1999 | Brown | F23C 3/00 126/102 |
| 6,039,109 | A * | 3/2000 | Chagnot | F24F 3/1423 165/10 |
| 6,209,622 | B1 * | 4/2001 | Lagace | F24F 3/1423 165/8 |
| 2003/0070787 | A1 * | 4/2003 | Moffitt | F24F 12/001 165/4 |
| 2006/0054302 | A1 * | 3/2006 | Cho | F23L 15/02 165/8 |
| 2008/0003940 | A1 * | 1/2008 | Haglid | F24F 3/14 454/228 |
| 2008/0108295 | A1 * | 5/2008 | Fischer | F24F 3/1423 454/239 |

* cited by examiner

LAYOUT FOR AN ENERGY RECOVERY VENTILATOR SYSTEM

CROSS REFERENCE TO RELATED INFORMATION

This application is a divisional of U.S. patent application Ser. No. 13/274,629, filed Oct. 17, 2011, titled, "Layout For An Energy Recovery Ventilator System," now U.S. Pat. No. 9,395,097, the contents of which are hereby incorporated herein in its entirety.

TECHNICAL FIELD

This application is directed, in general, to space conditioning systems and methods for conditioning the temperature and humidity of an enclosed space using an energy recovery ventilator.

BACKGROUND OF THE INVENTION

Energy recover ventilator units recover energy from exhaust air for the purpose of pre-conditioning outdoor air prior to supplying the conditioned air to a conditioned space, either directly, or, as part of an air-conditioning system. Many energy recover ventilator units available in the market today often employ a pull-push design using two forward-directed blowers. One blower is configured to pull fresh outside air through the unit towards the conditioned space, and the other blower is configured to push stale return air through the unit towards the outside space. Such units can have inherent problems relating to servicing of major system components, preventing moisture build-up, and, the ability to provide free cooling when ambient conditions are appropriate.

BRIEF SUMMARY OF THE INVENTION

One embodiment of the present disclosure is an energy recovery ventilator unit. The unit comprises a cabinet housing a primary intake zone, a supply zone, a return zone, an exhaust zone and an enthalpy-exchange zone. The primary intake zone and the exhaust zone are both on one side of the enthalpy exchange zone. The supply zone and the return zone are both on an opposite side of the enthalpy exchange zone. The unit also comprises first and second blowers. The first blower is located in the primary intake zone and configured to push outside air into the primary intake zone and straight through the enthalpy exchange zone into the supply zone. The second blower is located in the return zone and configured to push return air into the return zone and straight through the enthalpy exchange zone into the exhaust zone.

Another embodiment of the present disclosure is a method of manufacturing an energy recovery ventilator unit. The method comprises providing a cabinet having exterior walls and interior floors and walls that define an intake zone, a supply zone, a return zone, an exhaust zone and an enthalpy-exchange zone as described above. The method also comprises installing a first blower in the primary intake zone, the first blower configured to push outside air into the intake zone and straight through the enthalpy exchange zone into the supply zone. The method further comprises installing a second blower in the return zone, the second blower configured to push return air into the return zone and straight through the enthalpy exchange zone into the exhaust zone.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The term, "or," as used herein, refers to a non-exclusive or, unless otherwise indicated. Also, the various embodiments described herein are not necessarily mutually exclusive, as some embodiments can be combined with one or more other embodiments to form new embodiments.

Figure 1:
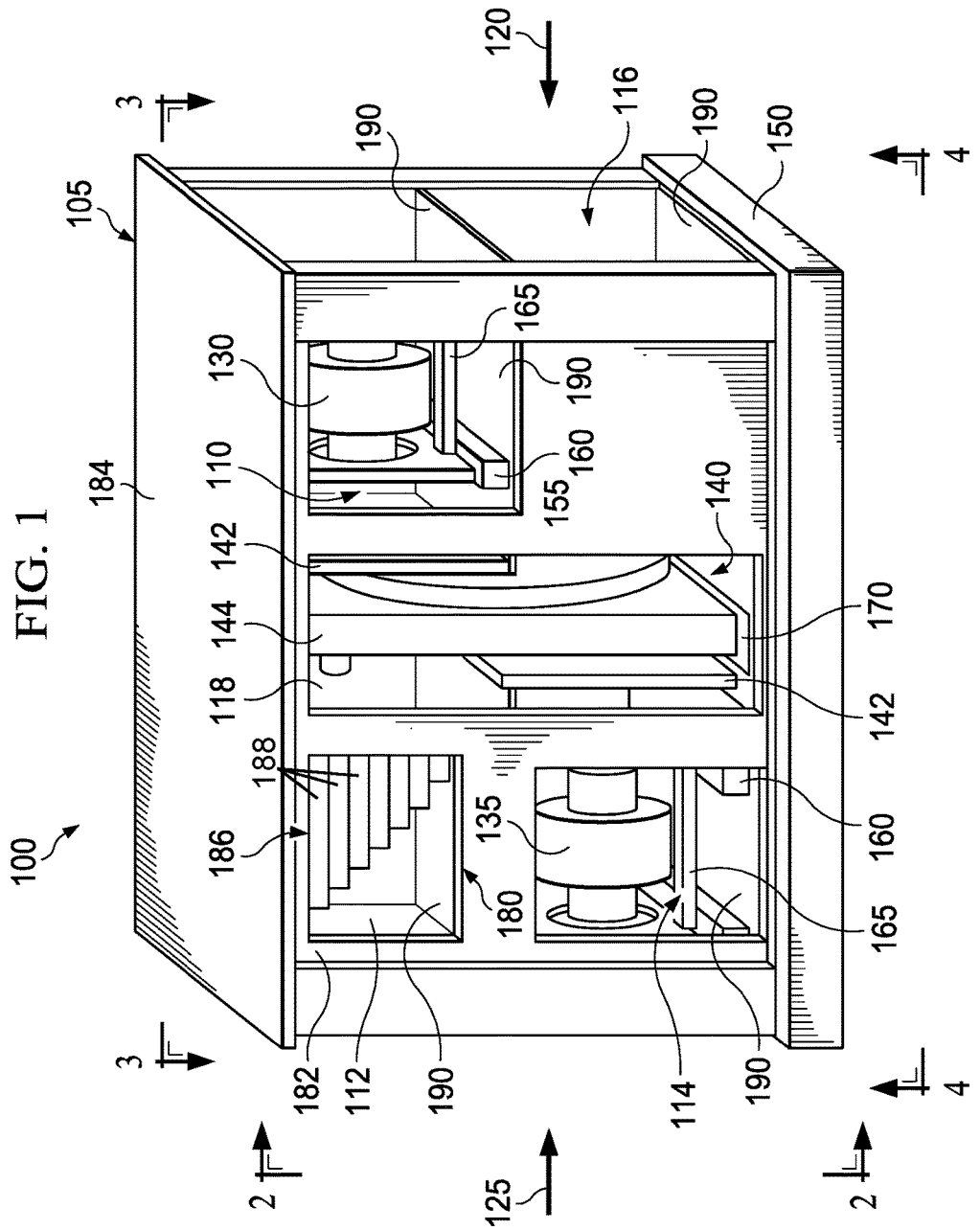
FIG. 1 presents a three-dimensional view of an example energy recovery ventilator unit of the disclosure.
Figure 2:
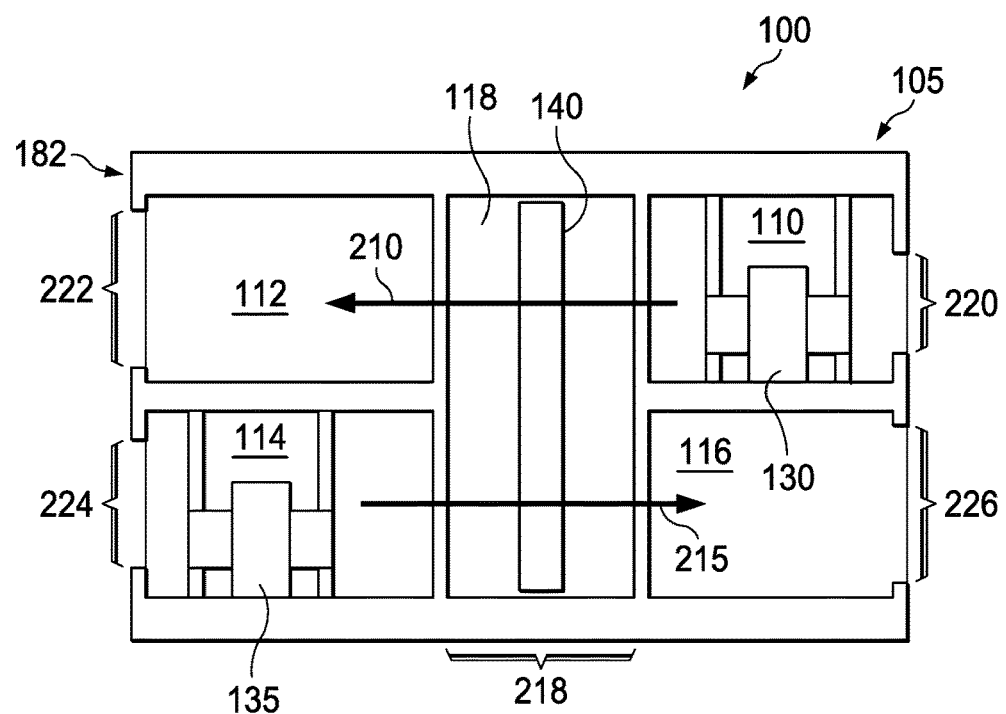
FIG. 2 presents a side view of the example energy recovery ventilator unit presented in FIG. 1 along view line 2 as shown FIG. 1.
Figure 3:
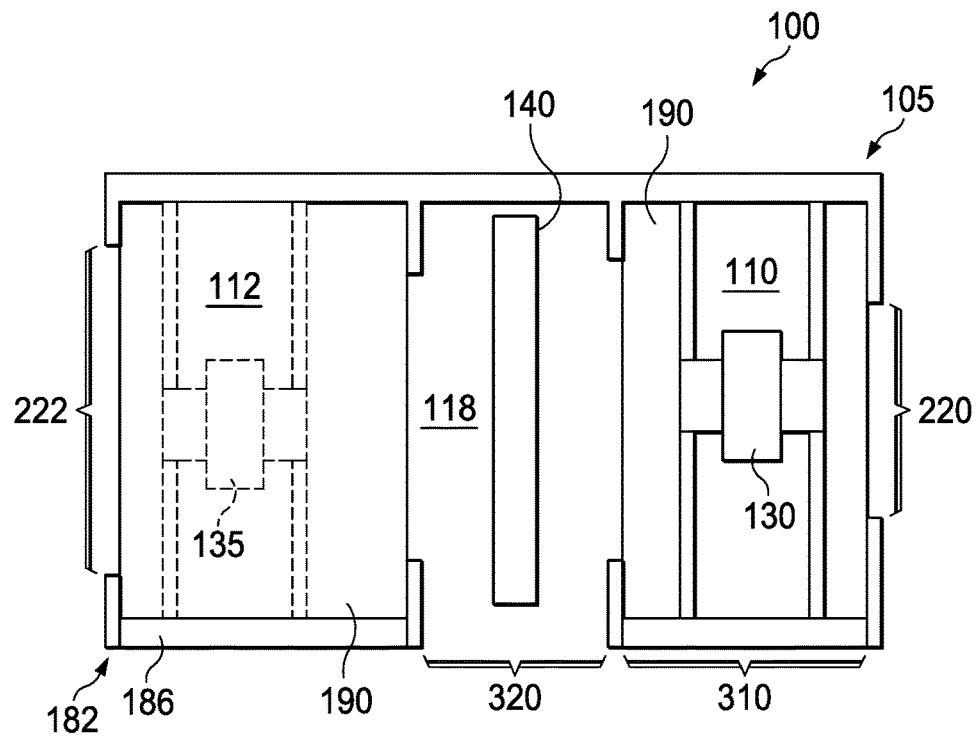
FIG. 3 presents a top plan view of the example energy recovery ventilator unit presented in FIG. 1 along view line 3 as shown FIG. 1.

One embodiment of the present disclosure is an energy recovery ventilator unit. FIG. 1 presents a three-dimensional view of an example energy recovery ventilator unit 100 of the disclosure. FIG. 2 presents a side view of the example energy recovery ventilator unit 100 presented in FIG. 1 along view line 2 as shown FIG. 1. FIG. 3 presents a top-down plan view of the example energy recovery ventilator unit 100 presented in FIG. 1 along view line 3 as shown FIG. 1. FIG. 3 presents a bottom-up plan view of the example energy recovery ventilator unit 100 presented in FIG. 1 along view line 4 as shown FIG. 1. Some exterior portions of a cabinet 105 are not shown in these figures so that the features within can be more clearly depicted.

As illustrated in FIG. 1, the energy recovery ventilator unit 100 comprises a cabinet 105 housing a primary intake zone 110, a supply zone 112, a return zone 114, an exhaust zone 116 and an enthalpy-exchange zone 118. The primary intake zone 110 and the exhaust zone 116 are both on one side 120 of the enthalpy exchange zone 118, and, the supply zone 112 and the return zone 114 are both on an opposite side 125 of the enthalpy exchange zone 118. The energy recovery ventilator unit 100 also comprises a first blower 130 and a second blower 135. The first blower 130 is located in the primary intake zone 110 and is configured to push outside air into the primary intake zone 110 and straight through the enthalpy exchange zone 118 into the supply zone 112. The second blower 135 is located in the return zone 114 and is configured to push return air into the return zone 114 and straight through the enthalpy exchange zone 118 into the exhaust zone 116.

For example, as illustrated in FIG. 2, the direction 210 of outside air is successively pushed, via the first blower 130, straight through the intake zone 110 and the enthalpy exchange zone 118 to the supply zone 112. The air from the supply zone 112 can subsequently travel towards a conditioned space, either directly, or indirectly, after traveling through other components (e.g., a roof top unit) of a space-conditioning system. In an opposite direction 215, return air is pushed by the second blower 135 successively through the return zone 114 and the enthalpy exchange zone 118 and the exhaust zone 116. The air from the supply zone can travel out of the cabinet 102 into the outside air.

The first and second blowers 130, 135, when blowing air, cause the primary intake zone 110, the supply zone 112, the return zone 114, the exhaust zone 116 and the enthalpy-exchange zone 118 to all have a positive pressure as compared to the atmospheric pressure outside of the cabinet 105. Having a positively pressurized cabinet 105 advantageously eliminates water intrusion into the cabinet 105, as compare to other energy recovery ventilator unit designs, where the cabinet is not designed to have a positive pressure.

Having a positively pressurized cabinet 105 also lowers the Outdoor Air Correction Factor (OACF) and Exhaust Air Transfer Ratio (EATR), thereby reducing the need for a purge option for the enthalpy exchange zone (e.g., the enthalpy wheel in the enthalpy exchange zone). The terms OACF and EATR as used herein, are used as defined by the Air-conditioning Heating and Refrigeration Institute Standard 1060, which is incorporated reference herein in its entirety (Arlington, Va.).

As illustrated in FIGS. 1-4, the first and second blowers 130, 135 are positioned diagonally (either vertically or horizontally) with respect to each other in the cabinet 105. For instance, in some embodiments of the unit 100, such as shown in FIGS. 1-2, the primary intake zone 110 and the exhaust zone 116 are vertically stacked, and, the supply zone 112 and the return zone 114 are vertically stacked. In such embodiments, the first and second blowers 130, 135 are vertically diagonally positioned in the cabinet 105. However, in other embodiments all four of the zones 110, 112, 114, 116 can be in a same horizontal plane. In such instances, the zones 110, 112, 114, 116 are not vertically stacked. In such embodiments, for example, FIG. 2 could depict a top-down plan view and FIGS. 3-4 could depict side views of the unit 100, with respect to the blower and zone locations. In such embodiments, the first and second blowers 130, 135 are horizontally diagonally positioned in the cabinet 105.

In some embodiments, such as shown in FIGS. 1-2, the primary intake zone 110 is vertically stacked above the exhaust zone 116, and, the supply zone 112 is vertically stacked above the return zone 114. In such embodiments, the airflow from outside is in a direction 210 through the upper two zones 110, 112 towards the conditioned air space, and, the return airflow (e.g., from the conditioned space) is in an opposite direction 215 through the lower two zones 114, 116 towards the outside environment. In other embodiments, however, the location of the zones 110, 112, 114, 116 can be reversed such the exhaust zone 116 is vertically stacked above the intake zone 110, and, the return zone 114 is vertically stacked above the supply zone 112. In such cases, the outside airflow travels through the two lower zones 110, 112 and the return air travels through the two upper zones 114, 116.

The enthalpy-exchange zone 118 can include any enthalpy-exchanger device 140 configured to facilitate the transfer of sensible and latent heat and moisture in the outside air steam entering through the input zone 110 to/from the return air steam entering through the return zone 114. For instance, in some embodiments, the enthalpy-exchange zone 118 includes an enthalpy-exchanger device 140 configured as one or more enthalpy wheels. However, in other embodiments, the enthalpy-exchanger device 140 could be configured as a one or more plated heat exchangers or heat pipes. One skilled in the art would appreciate that the enthalpy-exchange zone 118 could include additional components to support or enhance the operation of the enthalpy-exchanger device 140. Example of such components include air filters 142 positioned adjacent to the enthalpy-exchanger device 140, a casing 144 to hold the enthalpy-exchanger device 140, or other components such as a drive mechanism to cause wheel rotation, or seals, to retard the leakage of air from one zone to another zone (e.g., from zone 110 to zone 112, or, from zone 114 to zone 116) without first passing through the enthalpy-exchanger device 140.

As illustrated in FIG. 1, in some embodiments, the enthalpy-exchanger device 140, configured as one or more enthalpy wheels, is vertically oriented with respect to a planar base 150 that the unit 100 is located on. That is, a major surface 155 of the wheel 140 can be substantially perpendicular to the base 150. Having such a vertical orientation can facilitate easy cleaning and servicing of the wheel 140, because the wheel 140 can be removed from the cabinet 105 without having to lift it out of the cabinet 105.

In some embodiments, the first and the second blowers 130, 135 are configured as impeller blowers, e.g., with backwards curved blades. The use of impeller blowers can be advantageous because their compact size is conducive to easy removal from the cabinet 105 for servicing or replacement. In other cases however, the other types of blowers, such as centrifugal blowers, can be used so long the blower can be configured to push air into its respective zone (e.g., one of zones 110 or 114) to thereby positively pressurize the cabinet 105.

In some embodiments, the intake zone 110 and the return zone 112 each include separate mounting platforms 160 configured to support a blower (e.g., one of first blower 130 or second blower 135) thereon, and, the mounting platforms 160 (or at least a portion thereof) are configured to slide in and out of the cabinet 105. For instance, the first and second blowers 130, 135, both configured as impeller type blowers, can be placed on mounting platforms 160 and the blowers 130, 135 can be secured in a casing 165 that includes wheels or rollers configured to roll on the mounting platform 160, or is otherwise configured to facilitate sliding the blowers 130, 135 in and out of the cabinet 105.

Similarly, in some embodiments, the enthalpy-exchange zone 118 includes a mounting platform 170 configured to support an enthalpy-exchange device 140 thereon, and the mounting platform 170 is configured to slide in and out of the cabinet 105. For instance, the casing 144 can includes wheels or rollers configured to roll on the mounting platform 170, to facilitate sliding the enthalpy-exchange device 140 in and out of the cabinet 105.

As further illustrated in FIG. 2, embodiments of the cabinet 105 can further include openings 220, 222, 224, 226 associated with each of the zones 110, 112, 114, 116. For instance, there can be an intake opening 220 connected to the intake zone 110 and an exhaust opening 226 connected to the exhaust zone 116, both of the primary intake and exhaust openings 220, 226 being located on one end 120 of the cabinet 105. There can be a supply opening 222 connected to the supply zone 112 and a return opening 224 connected to the returned zone 114, both the supply and return openings 222, 224 being located on an opposite end 125 of the cabinet 105.

As further illustrated in FIG. 1, some embodiments the cabinet 105 further include a secondary intake opening 180 located in a sidewall 182 of the cabinet 105, the secondary opening 180 connected to the supply zone 114. The secondary intake opening 180 is configured to provide a controlled delivery of outside air to the supply zone 114. The layout of the zones 110, 112, 114, 116 in the cabinet 105, such as described above, allows the secondary intake opening 180 to be located in the sidewall 182. This, in turn, can eliminate the need to increase the size of the cabinet, and/or to putting the opening 180 in a top wall 184 of the cabinet 105, e.g., above the enthalpy-exchange zone 118, and thereby increasing the vertical profile of the unit 100.

Under certain outside air conditions, the secondary intake opening 180 allows free-cooling of the conditioned space. That is, by by-passing the intake zone 110, the secondary intake opening 180 can allow cool outdoor air to entering the supply zone 114 without expending energy to push the outdoor air through the enthalpy zone 118 via the blower 130. Moreover, the degree of such so-called "free-cooling" can be adjusted by controlling the delivery of air through the secondary intake opening 180.

To facilitate the controlled delivery of outdoor air through the secondary opening 180, the secondary intake opening 180 can be covered with an air controller assembly 186 which is configured to control the volume of the outside air passing through the secondary intake opening 180. In FIG. 1, only a partial cut-away view of the example air controller assembly 186 is depicted so that the supply zone 112 and secondary input opening 180 can be more clearly depicted. In some cases, the air controller assembly 186 can include baffles or dampers 188 which are continuously adjustable to allow substantially no air, to large volumes of air, to pass through the secondary intake opening 180. One of ordinary skill would appreciate that other types of air controller assemblies 186 that could be used to control air flow through the secondary intake opening 180.

Figure 4:
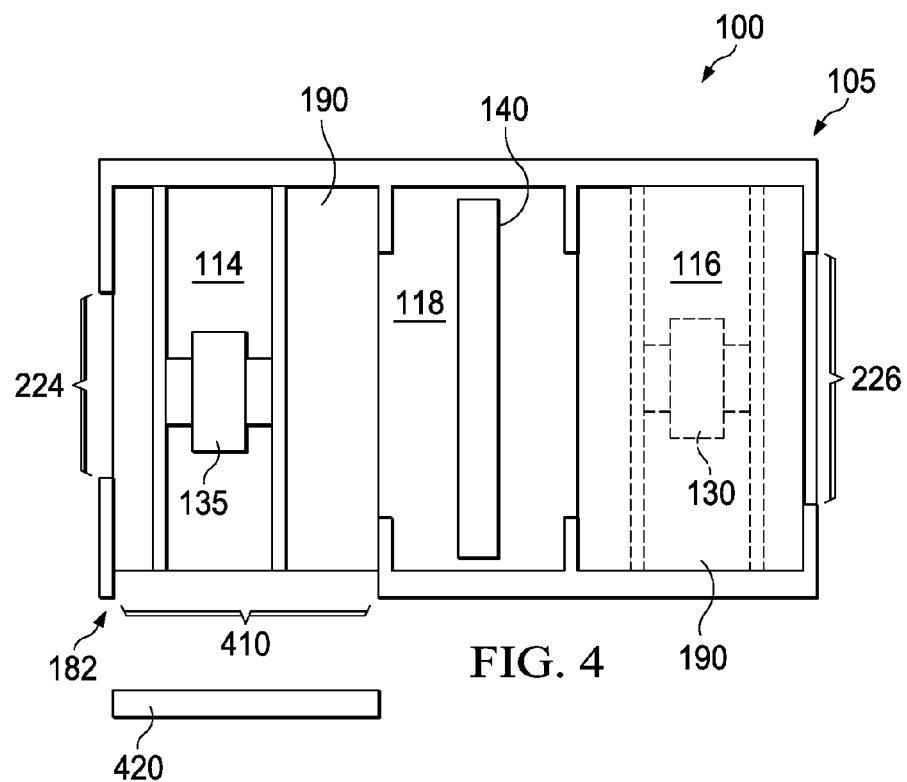
FIG. 4 presents a bottom plan view of the example energy recovery ventilator unit presented in FIG. 1 along view line 4 as shown FIG. 1.

As further illustrated in FIGS. 3-4, embodiments of the cabinet 105 can further include separate access openings 310, 410 for the first and second blowers 130, 135, located in intake zone 110 and the return zone 114, respectively, and, also include an access opening 320 in the enthalpy-exchanger zone 118. In some embodiments, these separate access openings 310, 320, 410 are all located in a same sidewall 182 of the cabinet 105 to advantageously allow to all of these components, 130, 135, 140 in the different zones 110, 114, 118, to be independently serviced from one side of the cabinet 105, without interrupting the unit's 100 operation, in some cases. When the unit 100 is in operation, the access openings 310, 320, 410 are preferably covered with thermally-insulated doors 330, 340, 420 that help form an air-tight and moisture-tight seal to the cabinet 105.

Figure 5:
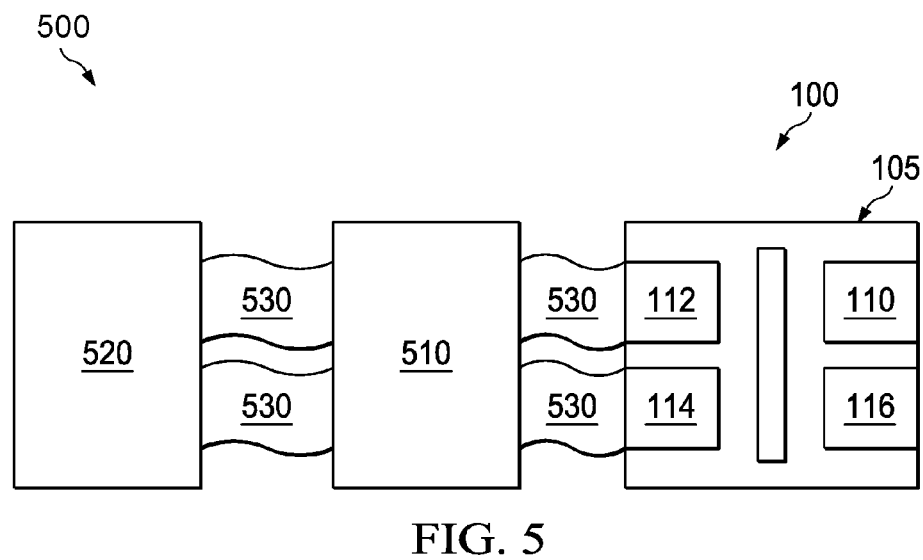
FIG. 5 presents a block diagram of the energy recovery ventilator unit as part of an example space conditioning system.

FIG. 5 presents a block diagram of the energy recovery ventilator unit 100, shown as part of an example space conditioning system 500. The unit 100 could comprise any of the example embodiments discussed in the context of FIGS. 1-4. As illustrated in FIG. 5, the supply zone 112 and the return zone 114 are coupled to an air-handler unit 510, e.g., a roof top unit, and the energy recovery ventilator unit 100 and the air handler unit 510 are both part of the space conditioning system 500. The air handling unit 510 sends conditioned air and receives stale air to and from a conditioned space 520 (e.g., the inside of house or building). One skilled in the art would be familiar with the appropriate connecting structures 530, (e.g., duct-work) to connect the air flows between the energy recovery ventilator unit 100 and air-handler unit 510 and between the air handler unit 510 and the conditioned space 520.

Figure 6:
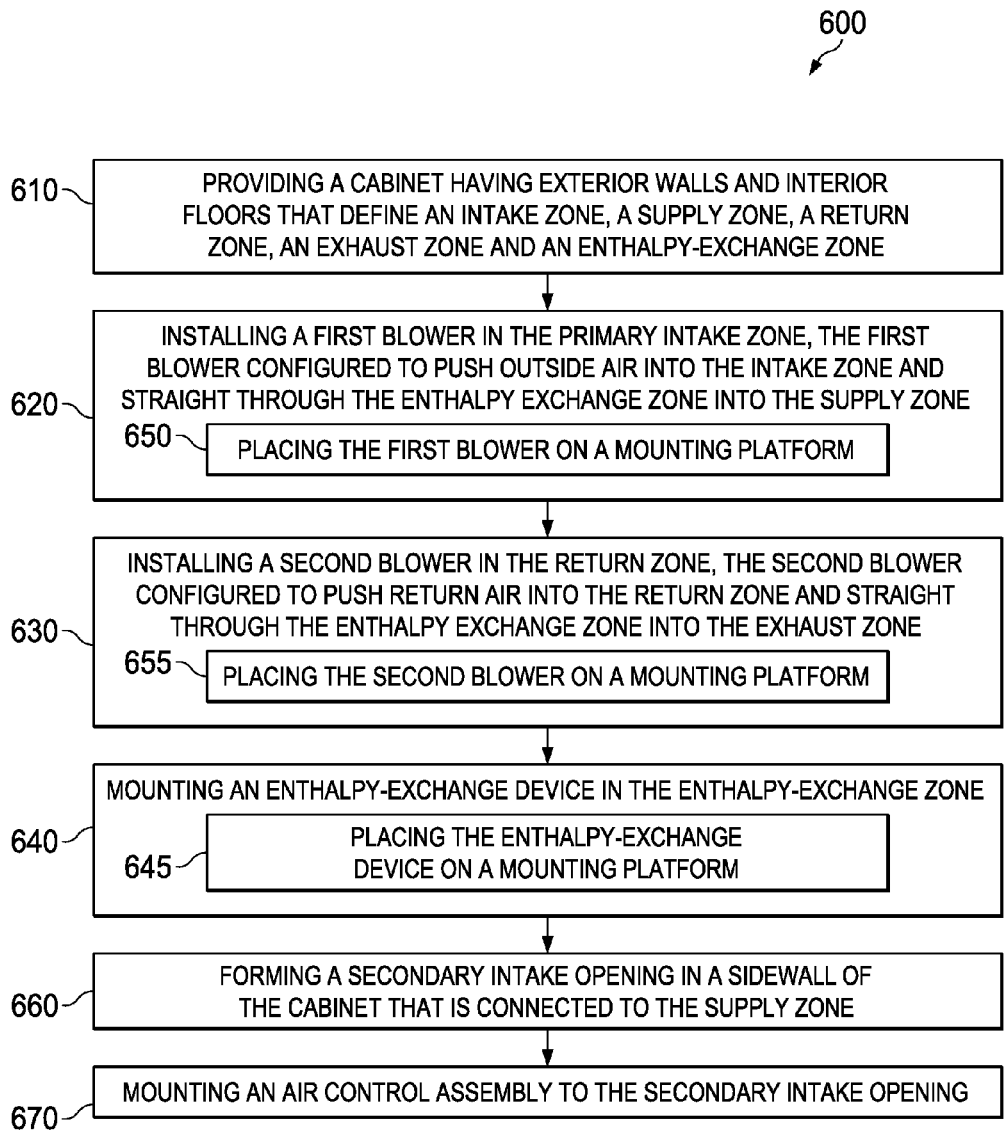
FIG. 6 presents a flow diagram of an example method of manufacturing an energy recovery ventilator unit of the disclosure, including any of the example embodiments discussed in the context of FIGS. 1-4.

Another embodiment of the present disclosure is a method of manufacturing an energy recovery ventilator unit, such as any of the units 100 discussed in the context of FIGS. 1-5. FIG. 6 presents a flow diagram of an example method 600 of manufacture.

With continuing reference to FIGS. 1-5 throughout, the example method 600 comprises a step 610 of providing a cabinet 105 having exterior walls 182, 184 and interior floors 190 that define a primary intake zone 110, a supply zone 112, a return zone 114, an exhaust zone 116 and an enthalpy-exchange zone 118. The primary intake zone 110 and the exhaust zone 116 are both on one side 120 of the enthalpy-exchange zone 118, and the supply zone 112 and the return zone 114 are both on an opposite side 125 of the enthalpy-exchange zone 118.

The method 600 further comprises a step 620 of installing a first blower 130 in the primary intake zone 110. The first blower 130 is configured to push outside air into the intake zone 110 and straight through the enthalpy exchange zone 118 into the supply zone 112. The method 600 further comprises a step 630 of installing a second blower 135 in the return zone 114. The second blower 135 is configured to push return air into the return zone 114 and straight through the enthalpy exchange zone 118 into the exhaust zone 116.

Embodiments of the method 600 further include a step 640 of mounting an enthalpy-exchange device 140 (e.g., one or more enthalpy wheels) in the enthalpy-exchange zone 118. For instance, the enthalpy wheel 140 or wheels can be mounted in a casing 144 such that the major surface 155 of the wheel 140 is substantially perpendicular the base 150 and the directions of air flow 210, 215 through the unit 100.

In some cases, the step 640 of mounting the enthalpy-exchange device 140 further includes a step 645 of placing the enthalpy-exchange device 140 on a mounting platform 170 configured to support the enthalpy-exchange device 140 thereon and sliding the enthalpy-exchange device 140 the mounting platform 160 into the cabinet 105.

Likewise, the steps 620, 320 of installing the first and second blowers 130, 135 can further include steps 650, 655 of placing the first and second blowers 130, 135 on separate mounting platforms 160 configured to support the respective blowers 130, 135 thereon, and sliding the blowers 130, 135 and the mounting platforms into the cabinet 105.

In some embodiments of the method 600 providing the cabinet 105 (step 610) can further include a step 660 of forming a secondary intake opening 180 in a sidewall 184 of the cabinet 105 that is connected to the supply zone 114. Those of ordinary skill in the art would be familiar with procedures such as laser cutting or mechanical cutting or grinding to form the opening 180 or other openings 310, 410, 420 in the walls 182, 184 of the cabinet 105.

In some embodiments of the method 600, providing the cabinet 105 (step 610) can include a step 670 of mounting an air control assembly 186 to the secondary intake opening 180. The air control assembly 186 can be configured to provide a controlled delivery of outside air to the supply zone 112, e.g., through the adjustment of the dampers 188 of the assembly 186.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of manufacturing an energy recovery ventilator unit, comprising:
    providing a cabinet having exterior walls and interior floors and walls that define an intake zone, a supply zone, a return zone, an exhaust zone and an enthalpy-exchange zone, wherein:
        the intake zone and the exhaust zone are both on one side of the enthalpy-exchange zone,
        the supply zone and the return zone are both on an opposite side of the enthalpy-exchange zone;
        the cabinet further defines an intake opening connected to the supply zone and proximately positioned vertically above the return zone, the intake opening configured to pass atmospheric air into the supply zone; and
        the cabinet further defines a first access opening providing access to the intake zone, a second access opening providing access to the return zone, and a third access opening providing access to the enthalpy-exchange zone, the first, second, and third access openings are located in a side wall of the cabinet;
    forming a secondary intake opening in the side wall;
    installing a first blower in the intake zone, the first blower configured to push outside air into the intake zone and straight through the enthalpy-exchange zone into the supply zone, the intake opening is downstream of the first blower; and
    installing a second blower in the return zone, the second blower configured to push return air into the return zone and straight through the enthalpy-exchange zone into the exhaust zone.

2. The method of claim 1, wherein the sidewall of the cabinet is connected to the supply zone.

3. The method of claim 2, further including mounting an air control assembly to the secondary intake opening, wherein the air control assembly is configured to provide a controlled delivery of outside air to the supply zone.

4. The method of claim 1, further including mounting an enthalpy-exchange device in the enthalpy-exchange zone.

5. The method of claim 1, wherein mounting the enthalpy-exchange device further includes placing the enthalpy-exchange device on a mounting platform configured to support the enthalpy-exchange device thereon and sliding the enthalpy-exchange device and the mounting platform into the cabinet.

6. The method of claim 1, wherein installing the first and second blowers further includes placing the first and second blowers on separate mounting platforms that are configured to support the respective blowers thereon, and, slide the blowers and the mounting platforms into the cabinet.

* * * * *

UNITED STATES PATENT AND TRADEMARK OFFICE
CERTIFICATE OF CORRECTION

PATENT NO. : 10,254,003 B2  
APPLICATION NO. : 15/187073  
DATED : April 9, 2019  
INVENTOR(S) : Justin McKie et al.

Page 1 of 1

It is certified that error appears in the above-identified patent and that said Letters Patent is hereby corrected as shown below:

In the Claims

Column 8, Line 25, Claim 2 should read as -- The method of claim 1, further including mounting an enthalpy-exchange device in the enthalpy-exchange zone. --, therefor.

Column 8, Line 27, Claim 3 should read as -- The method of claim 1, wherein mounting the enthalpy-exchange device further includes placing the enthalpy-exchange device on a mounting platform configured to support the enthalpy-exchange device thereon and sliding the enthalpy-exchange device and the mounting platform into the cabinet. --, therefor.

Column 8, Line 31, Claim 4 should read as -- The method of claim 1, wherein installing the first and second blowers further includes placing the first and second blowers on separate mounting platforms that are configured to support the respective blowers thereon, and, slide the blowers and the mounting platforms into the cabinet. --, therefor.

Column 8, Line 33, Claim 5 should read as -- The method of claim 1, wherein the sidewall of the cabinet is connected to the supply zone. --, therefor.

Column 8, Line 39, Claim 6 should read as -- The method of claim 5, further including mounting an air control assembly to the secondary intake opening, wherein the air control assembly is configured to provide a controlled delivery of outside air to the supply zone. --, therefor.

Signed and Sealed this  
Twenty-eighth Day of December, 2021

Drew Hirshfeld  
*Performing the Functions and Duties of the*  
*Under Secretary of Commerce for Intellectual Property and*  
*Director of the United States Patent and Trademark Office*